United States Patent [19]
Lundquist

[11] Patent Number: 4,792,321
[45] Date of Patent: Dec. 20, 1988

[54] RADIAL BALL TORQUE LIMITER
[75] Inventor: Mark S. Lundquist, Rockford, Ill.
[73] Assignee: Sundstrand Corporation, Rockford, Ill.
[21] Appl. No.: 64,682
[22] Filed: Jun. 22, 1987
[51] Int. Cl.⁴ .............................................. F16D 7/06
[52] U.S. Cl. .................... 464/35; 192/56 R; 464/37
[58] Field of Search ................. 192/56 R; 464/30, 35, 464/36, 37, 38

[56] References Cited
U.S. PATENT DOCUMENTS

| | | |
|---|---|---|
| 1,496,577 | 6/1924 | Klausmeyer . |
| 2,164,870 | 7/1939 | De Salardi . |
| 2,342,540 | 2/1944 | Hale .................... 464/35 |
| 2,344,673 | 3/1944 | Brown . |
| 2,459,092 | 1/1949 | Peterson et al. .................... 464/35 X |
| 2,544,809 | 3/1951 | Stanley . |
| 2,909,047 | 10/1959 | Walterscheid-Muller et al. ... 464/37 X |
| 3,567,010 | 3/1971 | Stein ................................ 464/35 X |
| 3,688,522 | 9/1972 | Schmuck ................................ 464/35 |
| 3,720,077 | 3/1973 | Jackson et al. . |

FOREIGN PATENT DOCUMENTS

| | | |
|---|---|---|
| 1081727 | 5/1960 | Fed. Rep. of Germany ........ 464/37 |
| 1216622 | 5/1966 | Fed. Rep. of Germany ........ 464/37 |
| 1166284 | 11/1958 | France .................................... 464/35 |
| 13442 | 6/1969 | Japan .................................... 464/36 |
| 526729 | 8/1976 | U.S.S.R. ................................ 464/35 |

OTHER PUBLICATIONS

Page 5 of an SKF publication, date unknown, but acknowledged prior printed publication.
Page 63 of an NHBB publication, date unknown, but acknowledged prior printed publication.

Primary Examiner—Daniel P. Stodola
Attorney, Agent, or Firm—Wood, Dalton, Phillips Mason & Rowe

[57] ABSTRACT

A radial ball torque limiter having a member with an annular wall defining a cavity with a plurality of rows of internal teeth extending circumferentially along the interior of the annular wall, an input shaft extending into the cavity, and one or more caged ball assemblies surrounding the input shaft with each having a circumferential row of balls loosely held by a generally annular cage to engage in ball-receiving recesses between adjacent teeth and the cage has a hub connected to the input shaft. A circular member positioned radially inward of the balls engages and yieldably holds the ball in the ball-receiving recesses during torque transmission from the input shaft to an output shaft and is yieldable upon the application of excessive torque to permit the balls to move inwardly and travel past the teeth to limit the value of the torque that is transmitted.

5 Claims, 1 Drawing Sheet

RADIAL BALL TORQUE LIMITER

DESCRIPTION

1. Field of the Invention

This invention pertains to a radial ball torque limiter also having utility as an inertial slip clutch and which with slight modification can be used as a one-way brake or no-back device.

2. Background of the Invention

Torque limiting devices function to preclude transmission of excessive torque. One common type of torque limiting device has a ball and ramp stucture with an example of such a structure being shown in the Twickler U.S. Pat. No. 4,176,733. Typically, a ball and ramp torque limiting device has a relatively small number of balls for a given load resulting in high loading on each ball as well as on the ball ramps and into the grounding point to the housing of the device. This results in a requirement for large, stiff preload spring stacks. It is inherent that there is a limited range of adjustability of the torque setting and in some designs, there are sliding friction members which increase the error of the torque setting over the life of the device.

A radial ball torque limiter can eliminate problems that exist with a ball and ramp torque limiting device. A radial ball torque limiter can utilize a larger number of balls for a given load and reduce loading on internal components. Also, the balls are reacted to a larger radii for a given torque compared to a ball and ramp device to increase the mechanical advantage thereof and reduce the size of the device.

Radially movable balls or rollers in devices for performing torque limiting or clutch action are known with these types of devices being shown in the Brown U.S. Pat. No. 2,344,673, Schmuck U.S. Pat. No. 3,688,522 and Jackson et al U.S. Pat. No. 3,720,077.

The known prior art devices have not provided for ready adaptability of a radial ball torque limiter to differing torque limiting requirements without the need for redesign by providing for stacking a desired number of caged ball assemblies to provide a larger number of balls for any given load requirement and with outwardly acting radial loading on the balls by a circular member with a continuous surface.

SUMMARY OF THE INVENTION

A primary feature of the invention is to provide a radial ball torque limiter having one or more caged ball assemblies interposed between a drive input and a drive output and which are urged radially outward by a member means disposed radially inwardly of the balls to have the balls yieldably retained in ball-receiving recesses. The limiting torque value for the torque limiter can be readily established by either varying the number of caged ball assemblies utilized, varying the number of balls per caged ball assembly or by changing the characteristics of the member disposed radially inward of the balls to change the spring force reacting against the balls.

An exemplary embodiment of the invention has a member with an annular wall defining a cavity which is operatively connected to an output shaft. A row of internal teeth extend circumferentially along the interior of the annular wall. An input shaft extends into the cavity with the shaft and cavity having a length sufficient to hold either a single caged ball assembly or a stack of such assemblies in surrounding relation to said input shaft and connected thereto and means are positioned radially inward of the balls of the caged ball assembly engaging and yieldably holding the balls in ball-receiving recesses between adjacent teeth.

More particularly, the means positioned radially inward of the balls for engaging and yieldably holding the balls in the ball-receiving recesses is in the form of a circular member surrounding the input shaft with there being one of said members associated with each of the caged ball assemblies and with said circular member being of an elastomeric material or of metal, plastic, or composite material.

An object of the invention is to provide a new and improved raidal ball torque limiter.

Another object of the invention is to provide a radial ball torque limiter having an output shaft rotatable about an axis, a member with an annular wall defining a cavity, a row of internal teeth extending circumferentially along the interior of said annular wall and with a ball-receiving recess between adjacent teeth, an input shaft rotatable about said axis and extending into said cavity, a caged ball assembly surrounding said input shaft and having a circumferential row of balls there being sufficient balls to have a ball positioned individually in all or every other one of said ball-receiving recesses and a generally annular cage for loosely holding said balls, said cage having a hub connected to said input shaft, and means positioned radially inward of said balls for engaging and yieldably holding said balls in said ball-receiving recesses.

A further object of the invention is to provide a radial ball torque limiter wherein said means yieldably holding the balls comprises an elastomeric ring surrounding the input shaft.

Another object of the invention is to provide a radial ball torque limiter as defined in the preceding paragraphs wherein the means for yieldably holding the balls comprises a circular member of either metal, plastic, or composite material surrounding the input shaft.

A further object of the invention is to provide a device usable as a torque limiter, inertial slip clutch or one-way brake which may be assembled readily of the number of components to meet operating requirements comprising a housing with a wall defining an internal cylindrical cavity, a shaft rotatable independently of said housing and extending into said cylindrical cavity centrally thereof, a preselected number of caged ball assemblies positioned within said cylindrical cavity between said shaft and said wall and spaced apart axially of said shaft, each of the caged ball assemblies having a generally annular cage with a hub connected thereto, a splined connection between each of said hubs and said shaft, a plurality of rows of alternating teeth and ball-receiving recesses on the inner surface of said wall with each row aligned with a caged ball assemblies, a plurality of balls movably retained by each of the annular cages and positioned in the ball-receiving recesses, and a plurality of annular members associated one with each caged ball assembly and positioned interiorly thereof to engage the radially inner surfaces of the balls and yieldably resist radially inward movement of the balls.

DESCRIPTION OF THE PREFERRED EMBODIMENTS

Figure 1:
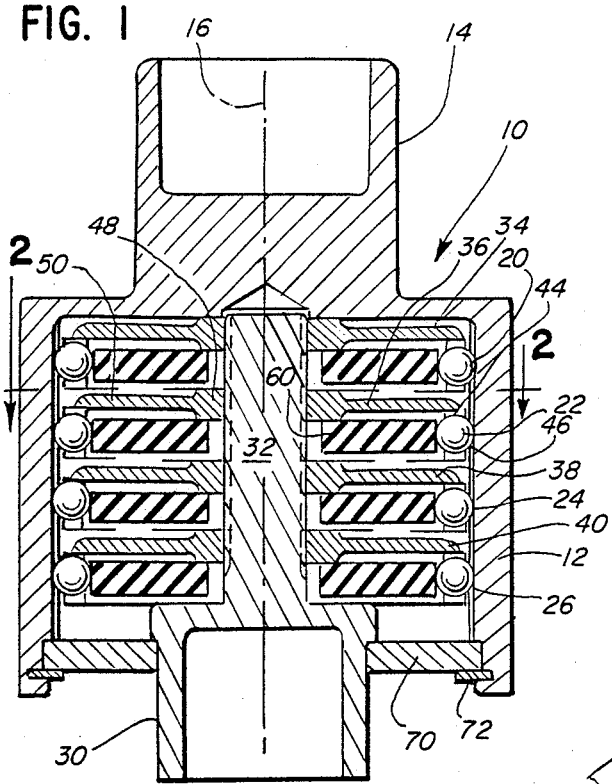
FIG. 1 is a central plan section of the radial ball torque limiter.
Figure 2:
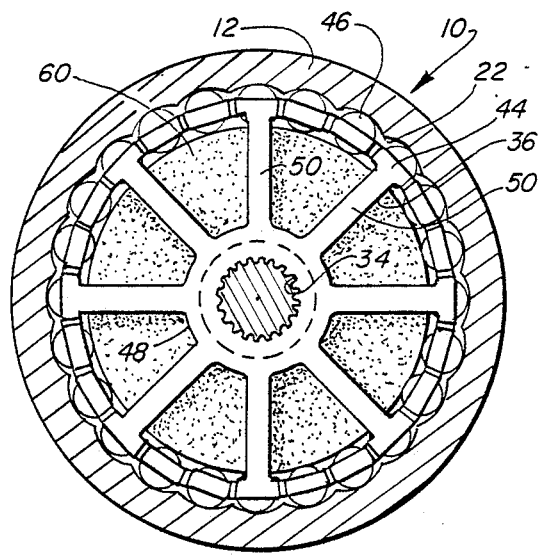
FIG. 2 is a vertical section taken generally along the line 2—2 in FIG. 1.

The radial ball torque limiter as seen generally in FIGS. 1 and 2 has a member indicated generally at 10 in the form of a housing having an annular wall 12 defining an internal cylindrical cavity.

An output shaft 14 is operatively connected to the housing and more particularly, as shown, is formed integrally therewith and is rotatable about an axis indicated by the broken line 16.

Figure 3:
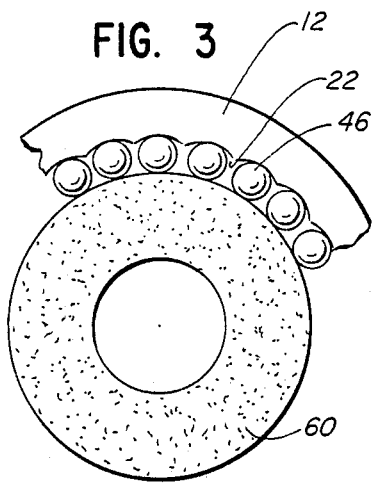
FIG. 3 is a fragmentary diagrammatic view of certain of the components shown in FIG. 2.

A plurality of rows of internal rounded teeth extend circumferentially along the interior of the annular wall with these rows of internal teeth being identified at 20, 22, 24 and 26 with the row 22 of internal teeth being shown particularly in FIGS. 2 and 3. Each of the rows of internal teeth defines a plurality of uniformed spaced ball-receiving recesses between adjacent teeth and there is a smooth transition between a recess and a tooth and the absence of any lands. The rows of teeth can be formed of teeth extending continuously along the wall interior.

An input shaft 30 is rotatable about the axis defined by the broken line 16 and has a reduced diameter section 32 with an external lengthwise series of splines 34 extending along substantially the entire length of the cavity in the housing. A stack of caged ball assemblies 34, 36, 38 and 40 of the same construction are positioned within the cavity and with each of the caged ball assemblies having a generally annular cage for loosely holding a plurality of balls engaged in a circular row and having a hub splined to the input shaft section 32. The structure for the caged ball assembly 36 is shown more particularly in FIG. 2. The generally annular cage 44, which can be of a commercially available type offered by either SKF or NHBB, loosely holds a circumferential row of balls 46 with the balls having sufficient radial inward movement from the position shown in FIGS. 1 and 2 to enable movement of a ball past a tooth in moving between ball-receiving recesses. The generally annular cage 44 is joined to a hub 48 by a series of radial spokes 50 and the hub is rotatable with the input shaft by a splined connection to the splines 34. Each of the caged ball assemblies 34, 38 and 40 are of the same construction as the caged ball assembly 36.

The radial ball torque limiter has means positioned radially inward of the balls for engaging and yieldably holding the balls in the ball-receiving recesses. This means, in one embodiment, is in the form of an elastomeric ring 60 surrounding and spaced from the input shaft section 32. One of these elastomeric rings is associated with each caged ball assembly and has the outer periphery thereof arranged with the radially inward surface of the balls. This elastomeric material can be relatively hard to hold the balls in the recesses but still having sufficient yieldability at a predetermined torque limit to enable radial inward movement of the balls so that the balls may travel to successive ball-receiving recesses and not transmit torque from the input shaft 30 to the output shaft 14.

The stack of caged ball assemblies are enclosed within the cavity of the housing by an end cap 70 and a retaining ring 72. As seen in FIG. 1 the input shaft can have a shoulder to generally retain the stacked caged ball assemblies in position. As subsequently discussed, the radial ball torque limiter can use less than the four caged ball assemblies that are shown and if a lesser number are used, a spacer may be located within the cavity to retain the one or more caged ball assemblies in operative position.

During normal operation, torque is applied at the input side of the torque limiter by way of the input shaft 30. The torque transmits to the caged ball assemblies by means of the splined connection to the input shaft section 32 and is transmitted to the housing 10 by means of the balls engaging in the ball receiving recesses. The elastomeric member 60 is under little or no compression by the balls but it offers sufficient resistance to radially inward movement of the balls to keep the balls engaged in the ball-receiving recesses. As a result, there is transfer of torque to the output shaft 14.

During torque limiting operation, the application of excessive torque results in a sufficiently high torque level to cause the balls to ride up each tooth of the row of internal teeth compressing the elastomeric member with resulting slight inward movement of the balls. As stated previously, the annular cage 44 provides for enough radial movement of the balls to enable their travel over the teeth. The continued application of high torque causes the balls to rotate freely over the internal teeth. As a result, the torque limiter is now in an ungrounded state and no torque is transmitted to the output side. When the input torque value is reduced to levels where the spring force of the elastomeric member pushes the balls into firm engagement with the ball receiving recesses, the output torque resumes.

Figure 4:
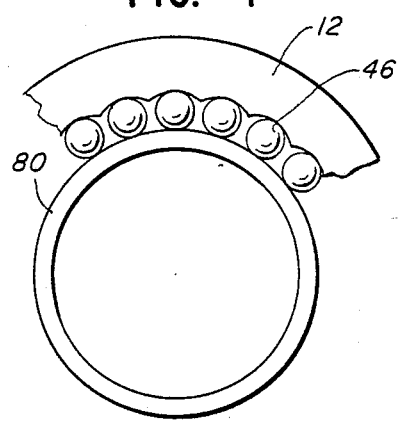
FIG. 4 is a fragmentary diagrammatic view similar to FIG. 3 showing an alternate form of spring force exerting means.

Alternatively to the use of the elastomeric ring 60, the yieldable means engaging the inner surface of the balls can be in the form of a circular member 80 shown in FIG. 4 which can be of metal, plastic, or composite material. Examples of a suitable metal are steel or beryllium copper. An example of a suitable plastic would be Teflon.

Figure 5:
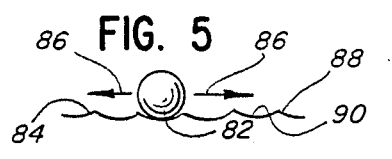
FIG. 5 is a diagrammatic view showing the coaction of a ball with symmetric teeth.

The action in torque limiting is shown diagrammatically in FIG. 5 wherein a ball 82 is associated with symmetric teeth 84 of a rounded saw tooth configuration whereby in either direction of application of excessive torque as indicated by the arrows 86, the ball 82 can ride over the crest 88 of a tooth and between succeeding ball-receiving recesses 90 between tooth crests. With this construction the device can also function as an inertial clutch.

Figure 6:
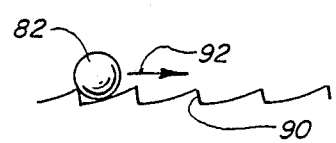
FIG. 6 is a diagrammatic view similar to FIG. 5 showing the coaction of a ball with asymmetric teeth.

With a variation in the shape of the teeth extending circumferentially along the interior of the annular wall to have the teeth asymmetric as shown in FIG. 6, a ball 82 is free to move between succeeding ball-receiving recesses in the direction of an arrow 92 but is precluded from moving in a opposite direction to thus enable use of the structure as a one-way brake or a no-back device.

With the stacked caged ball assemblies, a large number of balls can be utilized for a given load to reduce loading on internal components and reduce the size of the spring force that must react to excessive torque which urges the balls radially inward. The number of caged ball assemblies can be changed as well as the spring force provided by the yieldable means to greatly increase the adaptability of the radial ball torque limiter to different applications without the need for redesign. In addition to varying the number of caged ball assemblies utilized and the force of the internal spring member, it is also possible to vary the number of balls that are mounted in the annular cage of a caged ball assembly to have a ball associated with every other tooth to reduce torque. The tooth contour can be varied to achieve a torque limit setting.

The balls are reactive at a large radii for a given torque to maximize the mechanical advantage and reduce the overall size of the device. Further, the smooth continuity between the crest and ball-receiving recesses of the internal teeth provides for improved load handling with avoidance of pitting of the balls due to high stress concentration if the teeth were not smooth.

The yieldable means is a member in the form of an elastomeric ring or circular member of plastic, metal, or composite material and provides a continuous surface exerting a spring force to facilitate rolling of balls during a torque limiting operation with avoidance of sliding friction which thus increases the life of the device. It will be understood that the yieldable means is elastic in nature and yieldable within its modulus of elasticity.

With the location of the internal spring member radially inward of the balls, it is possible for the device to take advantage of centrifugal force to help maintain the balls in torque transmitting position and thus centrifugal force aids the spring force of the internal member and the spring force exerted by the internal member will remain constant throughout an entire range of speeds of operation for reliable operation.

I claim:

1. A device which may be assembled readily to meet operating requirements by stacking of two or more caged ball assemblies comprising:
   a housing with a wall defining an internal cylindrical cavity;
   a shaft rotatable independently of said housing and extending into said cylindrical cavity centrally thereof;
   a plurality of said caged ball assemblies positioned within said cylindrical cavity between said shaft and said wall in side-by-side relation, each of the caged ball assemblies having a generally annular cage with a hub connected thereto; said cylindrical cavity having a length axially of said shaft to receive two or more of said caged ball assemblies;
   a splined connection between each of said hubs and said shaft;
   a plurality of rows of fixed alternating teeth and ball-receiving recesses on the inner surface of said wall with there being sufficient rows to have one row individually aligned with a caged ball assembly;
   a plurality of balls movably retained by each of the annular cages and positioned in the ball-receiving recesses; and
   a plurality of annular members associated one with each caged ball assembly and positioned interiorly thereof to engage the radially inner surfaces of the balls and yieldably resist radially inward movement of the balls.

2. A device as defined in claim 1 wherein said teeth are symmetric to enable torque limiting operation in both forward and reverse rotation of said shaft.

3. A device as defined in claim 1 wherein said teeth are asymmetric with each tooth having a shoulder preventing movement of a ball from a ball-receiving recess in one direction of input shaft rotation to prvide unidirectional torque limiting and one-way brake operation.

4. A device as defined in claim 1 wherein said annular members are of an elastomeric material.

5. A device comprising:
   a housing with an annular wall defining a cylindrical elongate cavity;
   a shaft rotatable independently of said housing and extending into said cavity centrally thereof;
   a plurality of caged ball assemblies positioned side-by-side within said cylindrical cavity between said shaft and said annular wall, the caged ball assemblies each having a generally annular cage with a hub connected thereto;
   a spline drive connection between said hub and said shaft enabling movement of a caged ball assembly axially of the shaft in assembly of the device;
   a plurality of rows of fixed alternating teeth and ball-receiving recesses on the inner surface of said annular wall aligned one row with each caged ball assembly;
   each caged ball assembly having a plurality of balls supported by the annular cage thereof for rotation and radial movement and positioned in the ball-receiving recesses of a row; and
   means in the form of annular elastic members associated one with each caged ball assembly and positioned interiorly of the annular cage for engaging the radially inner surfaces of the balls to yieldably resist radially inward movement of the balls.

* * * * *